(No Model.)

C. F. STILLMAN.
TROTTING SULKY.

No. 244,404.

2 Sheets—Sheet 1.

Patented July 19, 1881.

Witnesses.

Inventor.
Chas. F. Stillman
by
Park Benjamin & Bro
Att'ys (No Model.) 2 Sheets—Sheet 2.

C. F. STILLMAN.
TROTTING SULKY.

No. 244,404. Patented July 19, 1881.

Witnesses.
Henry F. Dickie
Eugene Banta

Inventor:
Chas. F. Stillman
by
Park Benjamin & Bro
Att'ys.

UNITED STATES PATENT OFFICE.

CHARLES F. STILLMAN, OF PLAINFIELD, NEW JERSEY.

TROTTING-SULKY.

SPECIFICATION forming part of Letters Patent No. 244,404, dated July 19, 1881.

Application filed April 29, 1881. (No model.)

*To all whom it may concern:*

Be it known that I, CHARLES F. STILLMAN, of the city of Plainfield, county of Union, and State of New Jersey, have invented a new and Improved Trotting-Sulky, of which the following is a specification.

The object of my invention is to enable the horse to be attached to the vehicle more closely than is possible in the ordinary trotting-sulky, in which the axle is wholly in rear of the horse, and thus to cause the draft of the animal to be applied to better advantage. I claim that through this invention I unite horse and vehicle more closely into a single-moving object than has heretofore been done; that as a consequence there is less liability (if there be any at all) of any swinging or other independent movement of the sulky throwing the horse out of his gait; less wear upon, and hence greater durability of, the vehicle; increased safety to the occupant, and the possibility of fast trotting-horses making much better time than they have ever been enabled to accomplish with the old-fashioned sulky fastened on behind them.

The invention consists in curving the axle between the wheels upward, so that said axle shall extend over the horse. The horse then travels between the wheels, and the driver's seat is at the summit of the axle. Also, in the employment, with such a curved and elevated axle, of shafts which meet in a curve in rear of the horse and may be joined together in front of the horse, so as to form substantially a rigid encircling-frame.

Figure 1:
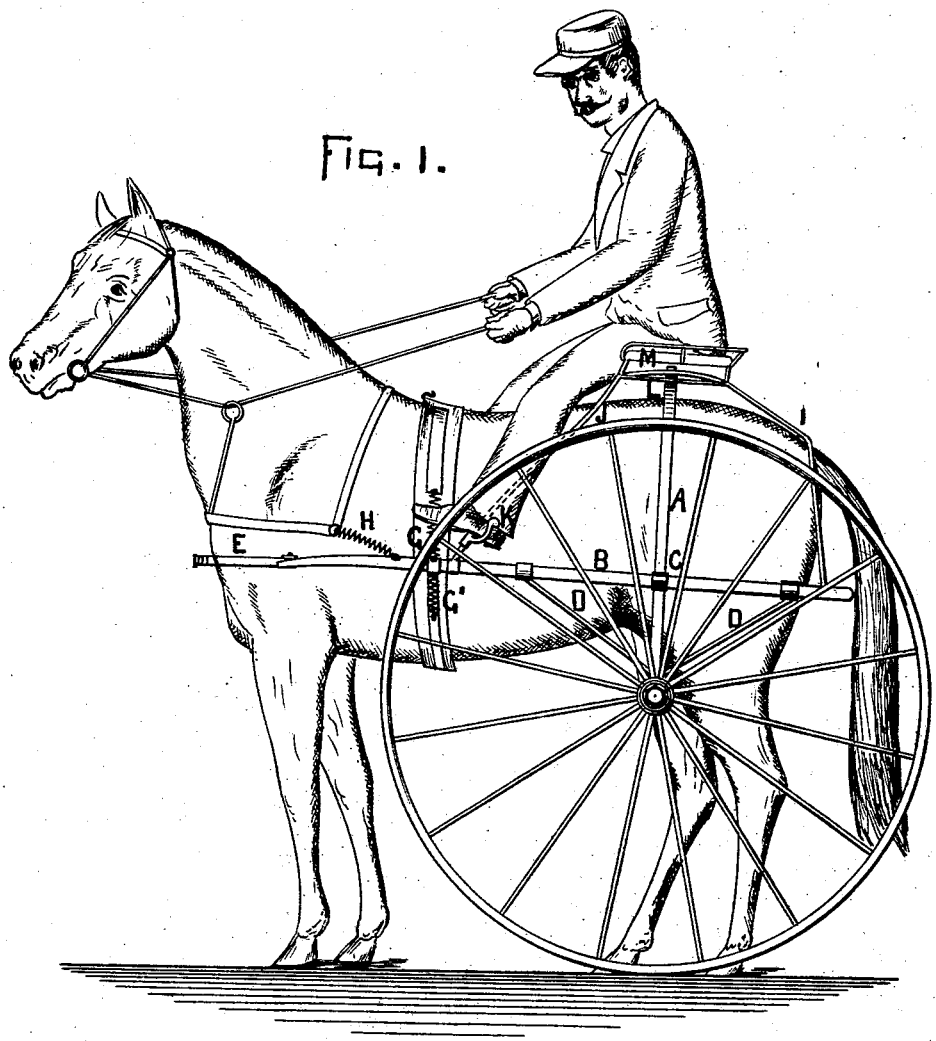
Figure 2:
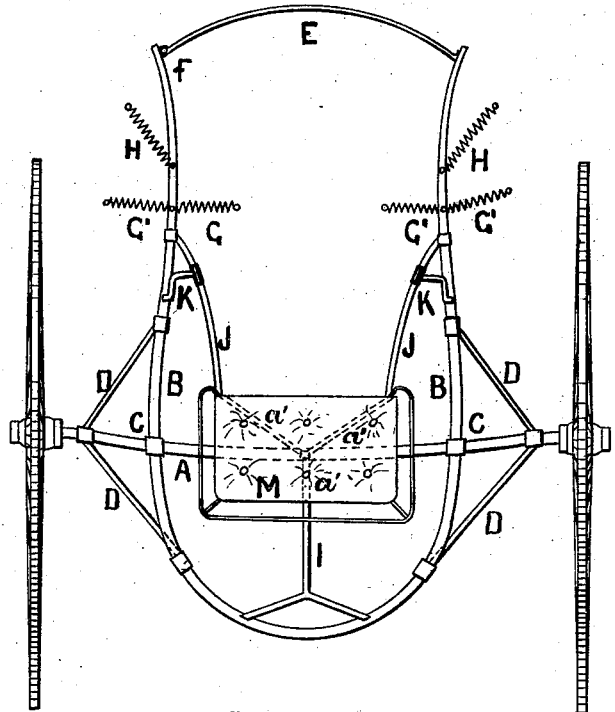

Figure 1 is a side elevation of my improved sulky, showing the horse and driver in place. Fig. 2 is a plan view, and Fig. 3 a rear view, of said sulky.

Similar letters of reference in the drawings indicate corresponding parts.

A is the axle, the middle portion of which is curved upward to such a height as to pass above the body of the horse when the animal is in place in the shafts. The lower extremities of the axle are bent or turned outward to receive the wheels.

The shafts B B are secured to the axle at the points C C on each side of the vehicle. Said shafts extend backward and meet in a curve in rear of the horse. This curving of the back ends of the shafts, together with arrangements for making the shafts adjustable, so that their spread may be increased or diminished, is described in Letters Patent No. 237,924, for a trotting-sulky, granted to me February 15, 1881.

Extending from the lower portions of the axle A to the shafts B B, also on each side of the vehicle, are the strengthening-braces D D.

The bar E forms a connecting or stiffening brace, extending between the shafts and in front of the horse, as shown in Fig. 1.

Figure 3:
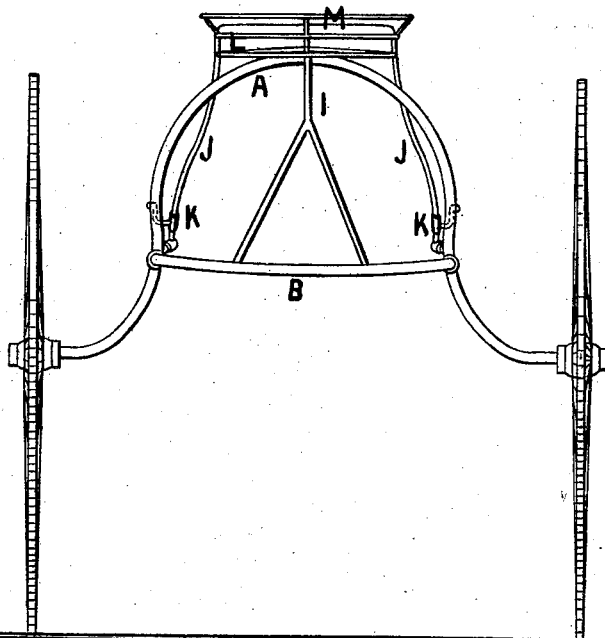

In order to prevent the irregular movements of the horse's body being transmitted to the light fabric of the vehicle, and at the same time to obviate the transmission of independent movements of the sulky to the horse, I attach springs G G' H on the upper and lower surface of each shaft and about opposite the position of the saddle on the horse. At the summit of the curved axle A is secured the rear seat-brace I. Said brace extends rearward and downward, and is bifurcated, as shown in Fig. 3, the ends of its branches being secured to the rear curved portion of the shafts B.

Also secured to the summit of the curved axle A are the ends of the front seat-braces, J. Said braces extend diagonally outward to the corners of the seat-frame, and thence downward and forward until they meet the shafts, to which they may be secured.

On the braces J are arranged the adjustable foot-rests K, the construction of which forms the subject of a separate application for Letters Patent made by me.

Between the braces H and J are introduced strengthening-bars L, forming a frame, and above this is arranged the frame which supports the seat M.

I do not limit myself to the precise arrangement of braces, seat, and axle, as above described, as it will be evident that various modes may be adopted for making this connection. Thus, instead of being attached to the summit of the axle, the braces proper may be turned upward to meet the seat-frame, in which case the dotted lines $a'$ would represent stays between the braces, Fig. 2, said stays being fastened to the axle.

I am aware that trotting-sulkies have hitherto been constructed with axles bent in an upward curve, and axles so formed I do not broadly claim. In such prior cases, however, the axle is wholly in rear of the horse, and the vehicle is thus wholly different from mine, the essential character of which is that the axle shall not be in rear of the horse, but shall extend over him. In this respect, also, my present invention differs materially from the sulky hitherto patented to me, (No. 237,924, February 15, 1881,) as in that vehicle the axle does not extend over the horse, but is curved horizontally rearward, and is combined with the curved rear portion of the shafts.

What I claim as new, and desire to secure by Letters Patent, is—

1. In a trotting-sulky, the combination of the upwardly-curved axle A, passing over the body of the horse, and the braces I and J, substantially as specified.

2. In a trotting-sulky, the combination of the upwardly-curved axle A, braces I and J, and seat M, substantially as specified.

3. In a trotting-sulky, the combination of the upwardly-curved axle A, braces I and J, seat M, and rearwardly connected and curved shafts B, substantially as specified.

CHARLES F. STILLMAN.

Witnesses:
H. R. MALLER,
C. G. HILDRETH.